United States Patent
Vinski (10) Patent No.: US 12,461,227 B2
(45) Date of Patent: Nov. 4, 2025

(54) METHOD AND APPARATUS FOR DETERMINING A LATERAL VEHICLE POSITION

(71) Applicant: Kapsch TrafficCom AG, Vienna (AT)

(72) Inventor: Lila Vinski, Markham (CA)

(73) Assignee: Kapsch TrafficCom AG, Vienna (AT)

( * ) Notice: Subject to any disclaimer, the term of this patent is extended or adjusted under 35 U.S.C. 154(b) by 430 days.

(21) Appl. No.: 18/055,434

(22) Filed: Nov. 15, 2022

(65) Prior Publication Data

US 2023/0228867 A1     Jul. 20, 2023

(30) Foreign Application Priority Data

Jan. 18, 2022   (EP) ..................................... 22152011

(51) Int. Cl.
*G01S 13/87*       (2006.01)
(52) U.S. Cl.
CPC ................... *G01S 13/878* (2013.01)
(58) Field of Classification Search
CPC .................................................... G01S 13/878
USPC ......................................................... 342/42
See application file for complete search history.

(56) References Cited

U.S. PATENT DOCUMENTS

| | | | | |
|---|---|---|---|---|
| 5,041,837 A * | 8/1991 | Shibano | ................... | G08G 1/13 342/457 |
| 5,196,846 A * | 3/1993 | Brockelsby | ............ | B61L 25/04 340/905 |
| 6,072,421 A * | 6/2000 | Fukae | ..................... | G01S 17/87 342/126 |
| 6,219,596 B1 * | 4/2001 | Fukae | ..................... | G01S 17/74 342/450 |
| 6,219,613 B1 * | 4/2001 | Terrier | .................... | G01S 13/74 342/51 |
| 7,057,520 B1 * | 6/2006 | Bartz | ................. | G07C 9/00309 340/568.1 |
| 7,110,880 B2 * | 9/2006 | Breed | .................... | G08G 1/167 340/995.13 |
| 7,610,146 B2 * | 10/2009 | Breed | .................... | G01C 21/28 701/300 |

(Continued)

FOREIGN PATENT DOCUMENTS

| | | | | |
|---|---|---|---|---|
| EP | 0237063 A1 * | 9/1987 | ............... | G08G 1/13 |
| EP | 0580139 B1 * | 4/1999 | ............... | G01S 5/04 |

(Continued)

OTHER PUBLICATIONS

Extended European Search Report received for European Patent Application No. 22152011.7, mailed on Apr. 28, 2022, 7 pages.

*Primary Examiner* — Nuzhat Pervin
(74) *Attorney, Agent, or Firm* — Weaver IP L.L.C.

(57) ABSTRACT

A method for determining a lateral position of a vehicle passing a road and carrying a transponder uses at least two antennas mounted at different lateral positions and connected to a processor and comprises: triggering the transponder and recording signals from responses of the transponder by the processor, each signal being received via one of the antennas and recorded as i) a time of receipt at said one antenna and ii) the lateral position of said one antenna; generating by the processor a regression curve fitting all recorded signals; and determining by the processor the lateral position of the vehicle from the generated regression curve. An apparatus implementing said method is also disclosed.

16 Claims, 2 Drawing Sheets

(56) References Cited

U.S. PATENT DOCUMENTS

| | | | | |
|---|---|---|---|---|
| 7,834,766 B2* | 11/2010 | Sawyer | ............ | G06K 7/10346 |
| | | | | 705/28 |
| 8,384,560 B2* | 2/2013 | Malarky | ............ | G08G 1/0175 |
| | | | | 455/406 |
| 8,508,341 B2* | 8/2013 | Kohli | ............ | G07B 15/063 |
| | | | | 455/406 |
| 8,576,114 B2* | 11/2013 | Kanner | ............ | B61L 25/025 |
| | | | | 342/51 |
| 8,730,066 B2* | 5/2014 | Malarky | ............ | G07B 15/063 |
| | | | | 340/936 |
| 8,830,299 B2* | 9/2014 | Osipov | ............ | G08G 1/0175 |
| | | | | 396/436 |
| 8,872,674 B1* | 10/2014 | Subramanya | ............ | G01S 13/00 |
| | | | | 340/939 |
| 9,460,619 B2* | 10/2016 | Kowalski | ............ | G08G 1/07 |
| 9,599,703 B2* | 3/2017 | Vinski | ............ | G06K 7/10207 |
| 9,702,963 B2* | 7/2017 | Kalliola | ............ | G01S 13/931 |
| 10,378,902 B1* | 8/2019 | Parodi | ............ | G01S 5/08 |
| 10,684,349 B2* | 6/2020 | Colucci | ............ | G01S 5/0264 |
| 10,744,977 B2* | 8/2020 | Neuhoff | ............ | H04B 7/06 |
| 11,237,262 B2* | 2/2022 | Tuttle | ............ | G01S 13/282 |
| 11,246,010 B2* | 2/2022 | Mao | ............ | G01S 5/14 |
| 2004/0249535 A1* | 12/2004 | Maass | ............ | B62D 15/029 |
| | | | | 701/72 |
| 2005/0137786 A1* | 6/2005 | Breed | ............ | B60W 30/18159 |
| | | | | 701/482 |
| 2007/0008184 A1* | 1/2007 | Ho | ............ | G08G 1/015 |
| | | | | 340/941 |
| 2008/0040029 A1* | 2/2008 | Breed | ............ | G08G 1/161 |
| | | | | 701/514 |
| 2009/0184847 A1* | 7/2009 | Kohli | ............ | G08G 1/017 |
| | | | | 340/989 |
| 2009/0231161 A1* | 9/2009 | Malarky | ............ | G08G 1/0175 |
| | | | | 340/10.41 |
| 2010/0237998 A1* | 9/2010 | Kohli | ............ | G07B 15/063 |
| | | | | 340/10.1 |
| 2013/0127643 A1* | 5/2013 | Malarky | ............ | G08G 1/017 |
| | | | | 340/989 |
| 2014/0326835 A1* | 11/2014 | Schwellnus | ............ | B61L 3/121 |
| | | | | 246/122 R |
| 2015/0054675 A1* | 2/2015 | Vinski | ............ | G01S 13/74 |
| | | | | 342/43 |
| 2015/0054676 A1* | 2/2015 | Vinski | ............ | G08G 1/0116 |
| | | | | 342/51 |
| 2019/0005813 A1* | 1/2019 | Edlund | ............ | H01Q 1/2216 |
| 2019/0143942 A1* | 5/2019 | Neuhoff | ............ | G07C 9/00309 |
| | | | | 340/5.72 |
| 2020/0336879 A1* | 10/2020 | Gravelle | ............ | G07B 15/063 |
| 2022/0135039 A1* | 5/2022 | Jardine | ............ | B60W 30/18163 |
| | | | | 701/26 |
| 2023/0159050 A1* | 5/2023 | Hershkovich | ............ | G06V 20/58 |
| | | | | 701/26 |

FOREIGN PATENT DOCUMENTS

| | | | | |
|---|---|---|---|---|
| EP | 0961134 A1 | * | 12/1999 | ............ G01S 13/876 |
| EP | 1939018 B1 | * | 10/2009 | ............ G01P 3/66 |
| EP | 1910864 B1 | * | 7/2011 | ............ G01S 13/878 |
| EP | 2409408 B1 | * | 5/2016 | ............ G07B 15/063 |
| EP | 3992659 A1 | * | 5/2022 | ............ G01S 5/22 |
| EP | 4027717 B1 | * | 7/2024 | ............ G01S 5/0284 |
| KR | 101755944 B1 | * | 7/2017 | ............ B60W 30/14 |
| WO | WO-2010105349 A1 | * | 9/2010 | ............ G07B 15/063 |

* cited by examiner

METHOD AND APPARATUS FOR DETERMINING A LATERAL VEHICLE POSITION

CROSS-REFERENCE TO RELATED APPLICATIONS

This application claims priority to European Patent Application No. 22 152 011.7, filed on Jan. 18, 2022, the entirety of which is incorporated herein by reference.

TECHNICAL FIELD

The present disclosed subject matter relates to a method and an apparatus for determining a lateral position of a vehicle passing a road and carrying a transponder.

BACKGROUND

In Electronic Toll Collection (ETC) systems, Automatic Vehicle Identification (AVI) and vehicle tracking is achieved by the use of Radio Frequency ("RF") communications between a transponder carried by a vehicle and several antennas mounted on a support like a gantry, a tunnel entry, one or more pillars, etc., across or next to the road. To determine the lateral position of the vehicle, i.e., the position transverse to the (longitudinal) direction of travel, each of the antennas covers a corresponding lateral portion of the road, e.g., a lane, such that the lateral positions of the antennas communicating with the vehicle indicate the lateral position of the vehicle.

Upon entering the coverage area of the antennas, the transponder is wirelessly triggered to repetitively send responses while the vehicle passes the road. These responses typically include a transponder ID for subsequent vehicle identification. Each sent response is received as a respective (response) signal solely via those antennas in whose coverage area the transponder is located at the respective time of receipt. Hence, from the known lateral position of each receiving antenna and the received signals, the lateral position of the vehicle can be determined and subsequently used, e.g., for lane specific charging, license plate or passenger recording by camera, High Occupancy Vehicle (HOV) lane inspection, fraudulent vehicle tracking, etc.

The coverage areas of adjacent antennas may either be separated or overlapping. Separated coverage areas, on the one hand, require a complicated tuning of the boundary between each two adjacent antennas and, thus, often result in a non-detection of the vehicle due to RF nulls or in a wrong detection of the vehicle during lane crossings due to reflections of the sent response at other vehicles passing the road. Overlapping coverage areas, on the other hand, while reducing RF nulls and reliably detecting lane crossings, also suffer from vehicle reflections and a more difficult and inaccurate position determination from the manifold of received signals.

Different methods of position determination from the received signals have been proposed for separated as well as overlapping coverage areas, e.g., determining the vehicle's lateral position as the lateral position of that antenna which i) received the most signals, ii) firstly received a signal, iii) lastly received a signal, or iv) received the signal with the highest signal strength. All these methods, however, suffer from a too low accuracy and often result in wrong position determination. Consequently, up to now wrong tolls and wrong vehicles are charged, and wrong or no license plate numbers are recorded in ETC systems.

BRIEF SUMMARY

It is an object of the disclosed subject matter to overcome these deficiencies of the state of the art and to provide a method and an apparatus which determine a lateral position of a vehicle with improved accuracy.

In a first aspect, this object is achieved with a method for determining a lateral position of a vehicle passing a road and carrying a transponder, the method using at least two antennas mounted at different predetermined lateral positions of the road and connected to a processor, the method comprising:

during the passing of the vehicle, wirelessly triggering the transponder and recording a multitude of signals from responses of the transponder by the processor, each signal being received via one of the antennas and recorded as i) a time of receipt of said signal at said one of the antennas and ii) the predetermined lateral position of said one of the antennas;

generating by the processor a regression curve of lateral position versus time fitting all recorded signals; and determining by the processor the lateral position of the vehicle from the generated regression curve.

The time of receipt of each signal may be recorded in any temporal granularity, e.g., as a sample designation or sample index in a time-discrete, i.e., sample-based, computer system. Similarly, the lateral position of the antenna of each signal may be recorded in any spatial granularity, e.g., as a lane designation or lane index in a lane-based road system.

The disclosed subject matter is based on subjecting the recorded multitude of signals, i.e., their corresponding times of receipt and lateral positions of the receiving antennas, to regression analysis in order to generate an accurate regression curve which fits the recorded signals, and to determine the vehicle's lateral position accurately therefrom.

As the disclosed subject matter makes use of all the recorded signals when generating the regression curve, the whole recorded information is utilised. In particular, "outlier" signals which have been received via vehicle reflection at a wrong antenna or "missing signals" when a response is not received at all, e.g., during lane crossings or due to RF nulls, are effectively compensated for by employing regression analysis rendering the method suitable for separated and overlapping coverage areas.

As a result of the high accuracy of the inventive position determination, the number of wrongly determined positions, wrongly charged tolls and vehicles, and wrongly recorded license plate numbers is significantly reduced in ETC systems.

The lateral position of the vehicle can be determined from the regression curve in any required temporal granularity, e.g., at a single time point, or over time by evaluating the generated regression curve at the required one or more time points, or as an average of the evaluated time points. Hence, even in case of a lane crossing the vehicle may be reliably located throughout its passage simply by evaluating the regression curve at several time points or by taking an average which then results in a lateral position between two lanes.

Moreover, the inventive lateral position determination excels in high flexibility as it can be easily adapted to the specific application, e.g., by employing a higher number of responses sent by the transponder in a certain time period and/or larger antenna coverage areas in case of a high speed road, and lower number of responses per time period and/or smaller coverage areas in case of a low speed road.

The disclosed subject matter may be used with a variety of antennas such as directional or omnidirectional antennas, which may be mounted above to, next to or under the road in a variety of positions. In the following three optional embodiments, which may optionally be combined, the antenna setup is particularly regular.

In a first embodiment, the antennas are mounted at a same longitudinal position of the road. Such antennas mounted orthogonal to the longitudinal direction of travel allow to uniformly cover the road in the vicinity of said longitudinal position.

In a second embodiment, the predetermined lateral positions of the antennas are equidistant. Similarly, this allows for a uniform coverage of the road. Furthermore, in this embodiment the lateral position of each antenna may be indicated simply by a respective integer multiple of the distance between adjacent antennas which facilitates the generation of the regression curve and lateral position determination.

In a third embodiment, the antennas have the same antenna gain and directivity. This results in particularly comparable received signals and, thus, enables a particularly simple and effective generation of the regression curve without taking into account the gain and directivity of each antenna. Moreover, when using identical antennas, an unequal degradation over time and a concomitant maintenance and adjustment of the antennas are prevented.

In particular for lane-specific charging, the enforcement of HOV lanes, etc., lanes provide a practical unit for (pre-) determining the lateral position of the vehicle and the antennas. This is exploited in a particularly favourable embodiment of the disclosed subject matter wherein the road comprises at least two lanes and the lateral positions of the antennas are predetermined with respect to the lanes and the lateral position of the vehicle is determined with respect to the lanes.

In one embodiment, the transponder may be active, e.g., battery powered, and triggered only once in order to repetitively send responses during the passing of the vehicle. In an advantageous embodiment, however, said triggering is performed repetitively. Thereby, a simpler and cheaper passive transponder, which does not require a battery, may be utilised and powered by the RF field of each wireless trigger signal to answer with a respective response thereto.

In a particularly efficient and accurate embodiment, said regression curve is a linear function according to $$x(t) = b \cdot t + a \quad (1)$$

wherein $$b = \frac{N \cdot \sum_{\substack{i=1\ldots I \\ j=1\ldots J(i)}} x_i \cdot t_{i,j} - \left(\sum_{i=1\ldots I} x_i \cdot J(i)\right) \cdot \left(\sum_{\substack{i=1\ldots I \\ j=1\ldots J(i)}} t_{i,j}\right)}{N \cdot \sum_{\substack{i=1\ldots I \\ j=1\ldots J(i)}} t_{i,j}^2 - \left(\sum_{\substack{i=1\ldots I \\ j=1\ldots J(i)}} t_{i,j}\right)^2} \quad (2)$$

and $$a = \frac{1}{N} \cdot \left(\sum_{i=1\ldots I} x_i \cdot J(i)\right) - b \cdot \frac{1}{N} \cdot \left(\sum_{\substack{i=1\ldots I \\ j=1\ldots J(i)}} t_{i,j}\right) \quad (3)$$

with
x(t) lateral position x versus time t of the regression curve,
a, b parameters of the regression curve,
N number of all recorded signals,
$x_i$ predetermined lateral position of the $i^{th}$ antenna,
$t_{i,j}$ time of receipt of the $j^{th}$ signal received via the $i^{th}$ antenna,
I number of all antennas, and
J(i) number of all signals received via the $i^{th}$ antenna.

Such a linear function with analytic regression parameters enables a particularly fast and efficient generation of the regression curve. Moreover, in the vicinity of the antennas, the track of most vehicles is approximated very accurately by a linear function, which, in turn, results in a particularly accurately determined lateral position.

In another particularly accurate embodiment, for each signal also iii) the signal strength of receipt is recorded and, when generating said regression curve, each signal is weighted by its signal strength of receipt. The signal strength of receipt is a measure for a proximity of the transponder to a receiving antenna and, thus, particularly suited for being exploited in the generation of a very accurate regression curve. Furthermore, the signal strength of receipt can be easily measured, e.g., as a received signal strength indication, RSSI, value according to the IEEE 802.11 standard or the like.

In a simple and efficient variant thereof, the regression curve is a linear function according to $$x(t) = b \cdot t + a \quad (4)$$

wherein $$b = \frac{\sum_{\substack{i=1\ldots I \\ j=1\ldots J(i)}} v_{i,j} \cdot \left(\sum_{\substack{i=1\ldots I \\ j=1\ldots J(i)}} x_i \cdot t_{i,j} \cdot v_{i,j}\right) - \left(\sum_{\substack{i=1\ldots I \\ j=1\ldots J(i)}} x_i \cdot v_{i,j}\right) \cdot \left(\sum_{\substack{i=1\ldots I \\ j=1\ldots J(i)}} t_{i,j} \cdot v_{i,j}\right)}{\sum_{\substack{i=1\ldots I \\ j=1\ldots J(i)}} v_{i,j} \cdot \left(\sum_{\substack{i=1\ldots I \\ j=1\ldots J(i)}} t_{i,j}^2 \cdot v_{i,j}\right) - \left(\sum_{\substack{i=1\ldots I \\ j=1\ldots J(i)}} t_{i,j} \cdot v_{i,j}\right)^2} \quad (5)$$

and $$a = \frac{1}{\sum_{\substack{i=1\ldots I \\ j=1\ldots J(i)}} v_{i,j}} \cdot \left(\sum_{\substack{i=1\ldots I \\ j=1\ldots J(i)}} x_i \cdot v_{i,j}\right) - b \cdot \frac{1}{\sum_{\substack{i=1\ldots I \\ j=1\ldots J(i)}} v_{i,j}} \cdot \left(\sum_{\substack{i=1\ldots I \\ j=1\ldots J(i)}} t_{i,j} \cdot v_{i,j}\right) \quad (6)$$

with
x(t) lateral position x versus time t of the regression curve,
a, b parameters of the regression curve,
$x_i$ predetermined lateral position of the $i^{th}$ antenna,
$t_{i,j}$ time of receipt of the $j^{th}$ signal received via the $i^{th}$ antenna, $v_{i,j}$ signal strength of receipt of the $j^{th}$ signal received via the $i^{th}$ antenna, I number of all antennas, and J(i) number of all signals received via the $i^{th}$ antenna.

In a second aspect, the disclosed subject matter provides for an apparatus for determining a lateral position of a vehicle passing a road and carrying a transponder, the apparatus comprising:

at least one transmitter for wirelessly triggering the transponder; and at least two antennas mounted at different predetermined lateral positions of the road;

the apparatus being characterised by a processor connected to the antennas and configured to:
during the passing of the vehicle, record a multitude of signals from responses of the transponder, each signal being received by one of the antennas and recorded as i) a time of receipt of said signal at said one of the antennas and ii) the predetermined lateral position of said one of the antennas;
generate a regression curve of lateral position versus time fitting all recorded signals; and
determine the lateral position of the vehicle from the generated regression curve.

The disclosed subject matter provides for two alternative embodiments of the transmitter which wirelessly triggers the (active or passive) transponder as mentioned above, be it once or repetitively.

In a first embodiment said transmitter is formed by at least one of said antennas. Thereby, said antennas are transceivers and a separate transmitter is not necessary. In addition, triggering and receiving are carried out with the same antenna directivity and gain such that the coverage area of each antenna is utilised to a large extent.

In a second embodiment said transmitter is formed by a transmit antenna separate from said antennas. Thereby, interference of the trigger signal with a receive signal, e.g., a leakage of the transmitted power into a receiving antenna, is reduced. Optionally, the transmit antenna may have a larger coverage area than the other (receiving) antennas to assure a triggering of the transponder even before entering the coverage area of the antennas and, thus, to utilise the whole extent of the antennas' coverage area.

With respect to the advantages and further embodiments of the processor reference is made to the above-mentioned embodiments of the method.

BRIEF DESCRIPTION OF THE DRAWINGS/FIGURES

The disclosed subject matter shall now be described in further detail by means of exemplary embodiments thereof under reference to the enclosed drawings, in which.

DETAILED DESCRIPTION

Figure 1:
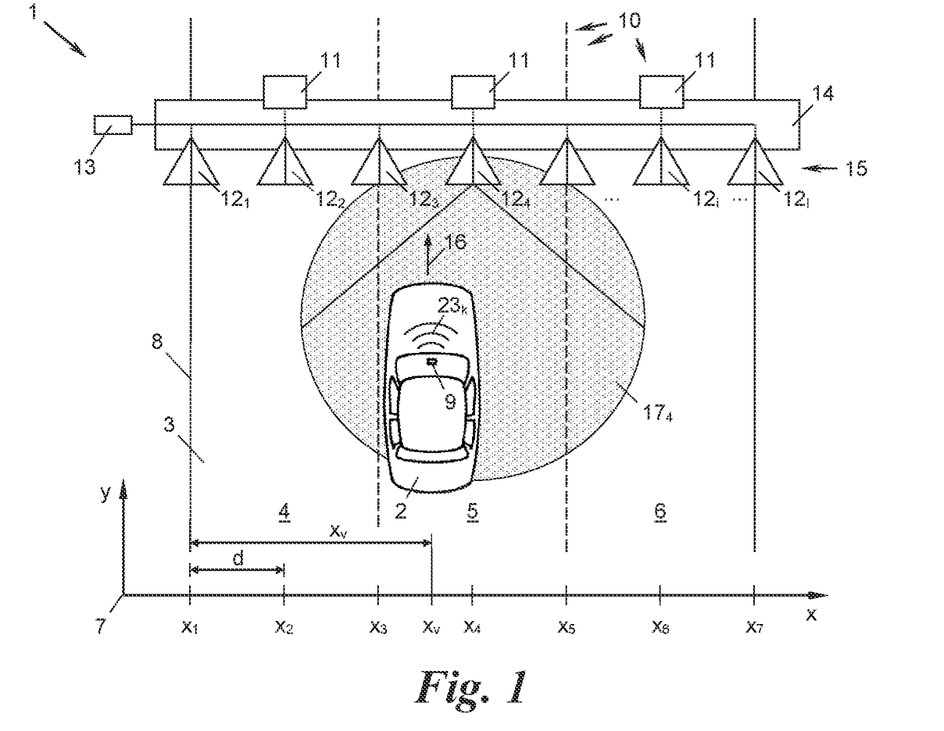
FIG. 1 shows an apparatus according to the disclosed subject matter for determining a lateral position of a vehicle passing a road in a schematic top view.

FIG. 1 shows an apparatus 1 which determines a lateral position $x_v$ of a vehicle 2 passing a road 3 with one or more (here: three) lanes 4-6. The vehicle 2 may be any vehicle such as a car, a truck, a (motor-)bike, or the like and its lateral position $x_v$ is a position transverse to a driving direction 16 of the road 3, e.g., a lateral distance measured from an outer edge 8 (or any other reference, e.g., the centreline) of the road 3 in a coordinate system 7. Alternatively, the lateral position $x_v$ may be measured very "coarsely" as simply the lane 4-6 on which the vehicle 2 is located (here: lane 5).

The lateral position $x_v$ of the vehicle 2 is determined by means of a multitude of wireless or radio-frequency (RF) communications between the apparatus 1 and a transponder 9 carried by the vehicle 2. To this end, the transponder 9 may be any active or passive transponder known in the art such as a DSRC or RFID transponder, and the communications may be carried out by any method such as TDMA, TDM, 6C, SeGo, 6B, ATA, Title 21, etc. and any standards such as DSRC, Wifi, Zigbee, RFID, IEEE 802.1x or the like.

To perform the communications, the apparatus 1 comprises at least one transmitter 10 (here: formed by three transmit antennas 11) for triggering the transponder 9 and at least two (here: seven) antennas $12_1, 12_2, \ldots, 12_I$, generally $12_i$, mounted at different predetermined lateral positions $x_1, x_2, \ldots, x_I$, generally $x_i$, of the road 3. Instead of being formed by the separate transmit antennas 11 the transmitter 10 may as well be formed by one or more of the antennas $12_i$ which are then used for the triggering. For determining the lateral position $x_v$ from said communications, the apparatus 1 further comprises a processor 13 connected to the antennas $12_i$. The antennas 11, $12_i$ may be any antennas, be it directional or omnidirectional, monopole, dipole, phased array, etc., and the processor 13 may be any processing device known in the art.

In the embodiment shown in FIG. 1, the antennas $12_i$ are mounted on a support 14 (here: a gantry spanning the road 3) in a regular setup: Firstly, the antennas $12_i$ are mounted on the support 14 at a same longitudinal position 15 in the direction of travel 16, i.e. the same y-position of the coordinate system 7. Secondly, the antennas $12_i$ are mounted at equidistant lateral positions $x_i$, i.e. with the same mutual distance d in the x-direction of the coordinate system 7 between each two adjacent antennas $12_i, 12_{i+1}$. Thirdly, the antennas $12_i$ each have the same antenna gain and directivity resulting in a same size (albeit a different position) of their respective coverage area $17_1, 17_2, \ldots, 17_I$, generally $17_i$ (only the coverage area $17_4$ of the fourth antenna $12_4$ being shown as a dotted area in FIG. 1).

In alternative embodiments (not shown), the antennas $12_i$ may be mounted in a less regular setup, e.g., at different lateral (x-)positions $x_i$, at different longitudinal (y-)positions, with unequal mutual distances d and/or they can have different antenna gains and directivities. It goes without saying that the antennas $12_i$ may as well be mounted on different supports such as pillars next to the road 3, above the road 3 at a bridge or tunnel entry or ceiling, under the road 3, etc. Moreover, the size of the coverage areas $17_i$ may be adapted to the specific application and, e.g., be larger in case of a high speed road and smaller in case of low speed roads.

Figure 2:
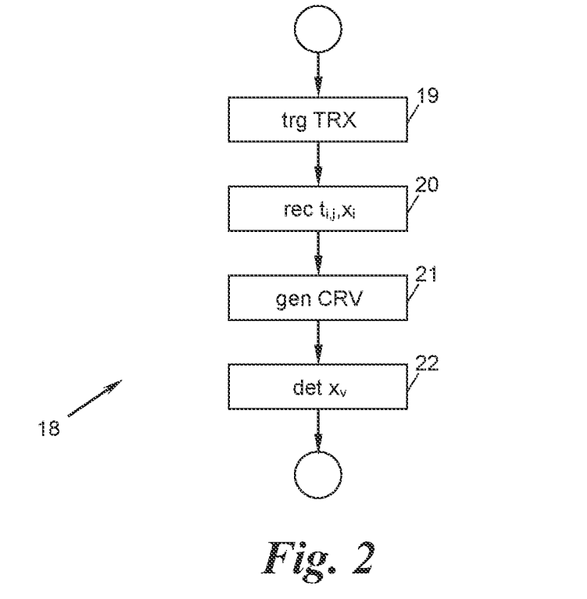
FIG. 2 shows a method according to the disclosed subject matter carried out by the apparatus of FIG. 1 in a flow diagram.
Figure 3:
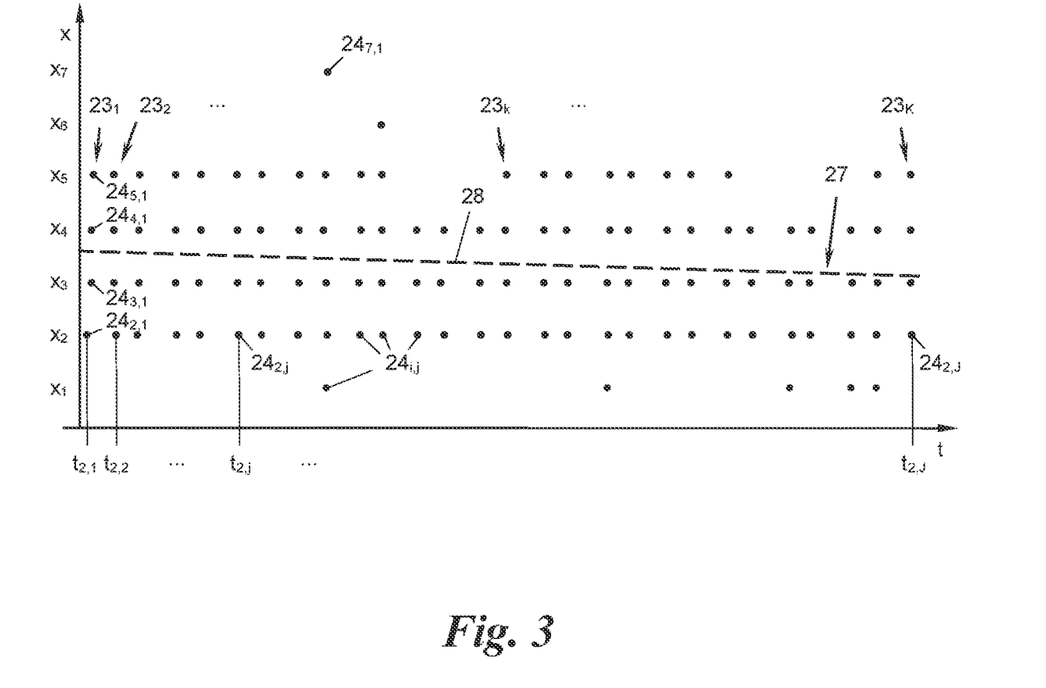
FIG. 3 shows signals from responses of a transponder carried by the vehicle of FIG. 1 as recorded by the processor of the apparatus of FIG. 1 in a diagram of lateral (antenna) position versus time together with a regression curve fitting said recorded signals.

With reference to FIGS. 1 to 3, a method 18 using the apparatus 1 for determining the lateral position $x_v$ of the vehicle 2 passing the road 3 shall now be described.

As illustrated in FIG. 2, the method 18 comprises four steps 19-22. In the first two steps 19, 20, a multitude of (response) signals $24_{i,j}$ received at the antennas $12_i$ from responses $23_1$, $23_2$, . . . , $23_K$, generally $23_k$, of the transponder 9 is recorded by the processor 13 during the passing of the vehicle 2. For this purpose, upon entering a communication zone of the antennas 11 of the transmitter 10, the transponder 9 ("TRX") is wirelessly triggered by the transmitter 10 in step 19 to send a multitude of responses $23_k$ thereto.

In a first "active transponder" embodiment, the transponder 9 may be triggered only once during the passing of the vehicle 2 in order to "wake-up", and subsequently send the responses $23_k$ one after the other. In a second "passive transponder" embodiment, the transponder 9 may be triggered repetitively, once for each response $23_k$ to be sent. The number of responses $23_k$ sent in a certain time period by an "active" transponder 9 or the number of triggerings of a "passive" transponder 9 per time period, respectively, may be adapted to the specific application and, e.g., be higher in case of a high speed road and lower in case of a low speed road.

Each response $23_k$ of the transponder 9 is wirelessly received by one or more of the antennas $12_i$ as a respective signal $24_{i,j}$, with i=1 . . . I, j=1 . . . J(i), and J(i) denoting the number of all signals received via the $i^{th}$ antenna $12_i$, from this one response $23_k$. For instance, as shown in FIG. 3, the first response $23_1$ sent by the transponder 9 is received by the second to fifth antennas $12_2$-$12_5$ (indicated by their respective predetermined lateral positions $x_2$-$x_5$) as their respective first (receive) signals $24_{2,1}$, $24_{3,1}$, $24_{4,1}$, $24_{5,1}$ caused by this response $23_1$.

The receive signals $24_{i,j}$ from the responses $23_k$ are recorded by the processor 13 in step 20. As can be seen in FIG. 3, the processor 13 records each signal $24_{i,j}$ as i) the time of receipt $t_{i,j}$ of this signal $24_{i,j}$ at the respective antenna $12_i$ and ii) the predetermined lateral position $x_i$ of this antenna $12_i$, i.e., $24_{i,j}=(t_{i,j}, x_i)$. Thus, when the vehicle 2 has passed the road 3 over the RF coverage areas $17_i$ of the antennas $12_i$, for each antenna $12_i$ a total number J(i) of times of receipt $t_{i,1}$, $t_{i,2}$, . . . , $t_{i,J}$ is recorded along with the lateral position $x_i$ of this antenna $12_i$ as a series of signals $24_{i,j}$ for this antenna $12_i$.

The processor 13 may record the (I series of) signals $24_{i,j}$ in any form, e.g. as a number of individual doublets $(t_{i,j}, x_i)$, as a list of times of receipt $t_{i,j}$ per lateral antenna position $x_i$, or as a matrix the columns of which stand for times of receipt $t_{i,j}$ and the rows of which stand for lateral positions $x_i$.

The times of receipt $t_{i,j}$ may be recorded in different ways and temporal granularities, e.g., each as a timestamp indicating an absolute or relative receiving time; in particular in the granularity of sampling periods or time frames covering multiple sampling periods. For example, each time of receipt $t_{i,j}$ may be recorded as a unique index of the respective sampling period or time frame in which the respective signal was recorded. Optionally, the times of receipt $t_{i,j}$ may be recorded according to their order of recording, i.e., each time of receipt $t_{i,j}$ as a unique index, etc. Furthermore, the lateral positions $x_i$ may be recorded in different ways and spatial granularities, e.g., each as an absolute or relative distance in the coordinate system 7, as (integer or fractional) lane numbers, as antenna indices (in particular in case of equidistant antennas $12_i$), etc.

From the signals $24_{i,j}$ recorded in steps 19 and 20, the processor 13 determines the lateral position $x_v$ of the vehicle 2 in subsequent steps 21 and 22. To this end, in the step 21, the processor 13 generates a regression curve 27 ("CRV") of lateral position versus time (FIG. 3) fitting all recorded signals $24_{i,j}$. The regression curve 27 approximates the recorded signals $24_{i,j}$ by regression analysis. Therefor, the processor 13 may employ any regression analysis known in the art such as linear or non-linear regression with any residual measure such as (weighted) least squares, generalised least squares, random sample consensus (RANSAC), etc.

In the embodiment shown in FIG. 3, the regression curve 27 is a linear function 28 according to $$x(t)=b \cdot t+a \quad (1)$$

wherein the parameters are determined by a least squares residual measure as $$b = \frac{N \cdot \sum_{\substack{i=1\ldots I \\ j=1\ldots J(i)}} x_i \cdot t_{i,j} - \left(\sum_{i=1\ldots I} x_i \cdot J(i)\right) \cdot \left(\sum_{\substack{i=1\ldots I \\ j=1\ldots J(i)}} t_{i,j}\right)}{N \cdot \sum_{\substack{i=1\ldots I \\ j=1\ldots J(i)}} t_{i,j}^2 - \left(\sum_{\substack{i=1\ldots I \\ j=1\ldots J(i)}} t_{i,j}\right)^2} \quad (2)$$

and $$a = \frac{1}{N} \cdot \left(\sum_{i=1\ldots I} x_i \cdot J(i)\right) - b \cdot \frac{1}{N} \cdot \left(\sum_{\substack{i=1\ldots I \\ j=1\ldots J(i)}} t_{i,j}\right) \quad (3)$$

or equivalently $$a = \frac{\left(\sum_{i=1\ldots I} x_i \cdot J(i)\right) \cdot \left(\sum_{\substack{i=1\ldots I \\ j=1\ldots J(i)}} t_{i,j}^2\right) - \left(\sum_{\substack{i=1\ldots I \\ j=1\ldots J(i)}} t_{i,j}\right) \cdot \left(\sum_{\substack{i=1\ldots I \\ j=1\ldots J(i)}} x_i \cdot t_{i,j}\right)}{N \cdot \sum_{\substack{i=1\ldots I \\ j=1\ldots J(i)}} t_{i,j}^2 - \left(\sum_{\substack{i=1\ldots I \\ j=1\ldots J(i)}} t_{i,j}\right)^2} \quad (3')$$

with
- x(t) lateral position x versus time t of the regression curve 27,
- a, b parameters of the regression curve 27,
- N number of all recorded signals $24_{i,j}$,
- $x_i$ predetermined lateral position of the $i^{th}$ antenna $12_i$,
- $t_{i,j}$ time of receipt of the $j^{th}$ signal $24_{i,j}$ received via the $i^{th}$ antenna $12_i$,
- I number of all antennas $12_i$, and
- J(i) number of all signals $24_{i,j}$ received via the $i^{th}$ antenna $12_i$.

In the last step 22 of the method 18, the processor 13 determines the lateral position $x_v$ of the vehicle 2 from the regression curve 27 generated in step 21. To this end, the processor 13 uses one or several function values of the regression curve 27 or its regression parameters and determines the lateral position $x_v$ therefrom.

In one embodiment, the processor 13 determines the lateral position $x_v$ of the vehicle 2 as the lateral position of the regression curve 27 evaluated at one or more time points of interest, e.g., at the time when the vehicle 2 is at a predetermined longitudinal position such as the gantry 14.

In another embodiment, the processor 13 determines the lateral position $x_v$ as a temporal average of the lateral position of the regression curve 27. As an example, the processor 13 may employ the linear function 28 of equation (1) and calculate an average over time according to $$x_v = \frac{1}{T} \int_0^T (b \cdot t + a) dt = \frac{b \cdot T}{2} + a, \quad (7)$$

wherein T denotes a time of passing of the vehicle 2, e.g., the time between the first and the last received signal $24_{i,j}$.

In a further embodiment, the processor 13 determines the current lateral position $x_v$ of the vehicle 2 at a time point of interest as an extrapolation lateral position of the regression curve 27 for that time point.

After determining the lateral position $x_v$ of the vehicle 2, the processor 13 may provoke further actions based on the determined lateral position $x_v$. For instance, the processor 13 may activate a camera (not shown) directed at the determined lateral position $x_v$ for license plate number recording, HOV lane inspection, initiating of toll collection, etc.

Generally, the lateral positions $x_i$, $x_v$, (and consequently the lateral position over time of the regression curve 27) may be (pre-)determined in any length unit, e.g., in metres, centimetres, etc. In a "lane-based" embodiment, the lateral positions $x_i$ of the antennas $12_i$ and the lateral position $x_v$ of the vehicle 2 are predetermined and determined, respectively, with respect to the lanes 4-6, i.e., each lateral position $x_i$, $x_v$ is given as an integer (or fractional) lane number. Consequently, the lateral position $x_v$ is directly determined as the lane 4-6 on which the vehicle 2 is located, here: lane 5 in FIG. 1, when the lateral position $x_v$ determined for the recorded signals $24_{i,j}$ of FIG. 3 by equation (7) lies between 4.5 and 5.

Figure 4:
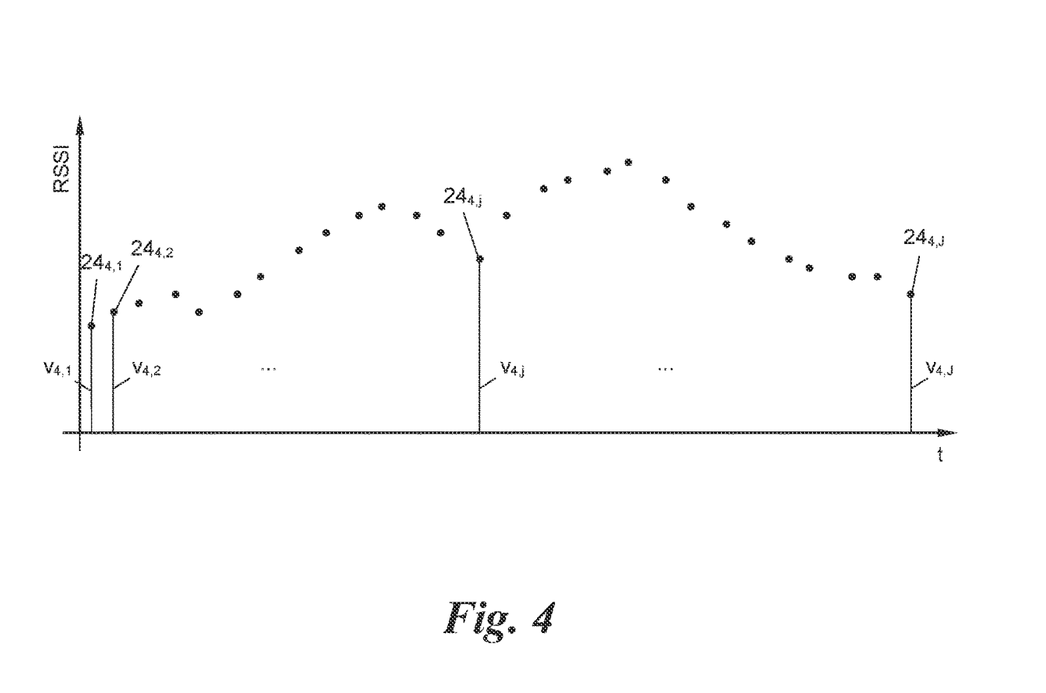
FIG. 4 shows the signal strength of receipt as optionally recorded by said processor for an exemplary antenna of the apparatus of FIG. 1 in a diagram over time.

With reference to FIG. 4, an optional embodiment incorporating also the signal strength of receipt $v_{i,j}$ of the signals $24_{i,j}$ in the steps 20 and 21 shall be described. Therein, in step 20 for each signal $24_{i,j}$ also iii) the signal strength of receipt $v_{i,j}$ is recorded by the processor 13. FIG. 4 exemplarily shows the received signal strengths of receipt $v_{4,j}$ of the signals $24_{4,j}$ received via the fourth antenna $12_4$. The signal strengths of receipt $v_{i,j}$ may be recorded as any measure of signal strength known in the art, e.g., as a received signal strength indication, RSSI, value according to an IEEE 802.1x standard or the like.

The recorded signal strengths of receipt $v_{i,j}$ are then considered in the step 21 of generating the regression curve 27 in that each signal $24_{i,j}$ is weighted by its signal strength of receipt $v_{i,j}$ when approximating all recorded signals $24_{i,j}$ by means of the regression curve 27. For this purpose, a variety of weighting procedures, e.g., linear or non-linear weightings, may be combined with a variety of regression analyses, e.g., linear or non-linear regression. In one embodiment the regression curve is a linear function according to $$x(t) = b \cdot t + a \quad (4)$$

and each signal strength of receipt $v_{i,j}$ occurs in a linear fashion when determining the regression parameters according to $$b = \frac{\displaystyle\sum_{\substack{i=1\ldots I \\ j=1\ldots J(i)}} v_{i,j} \cdot \left(\sum_{\substack{i=1\ldots I \\ j=1\ldots J(i)}} x_i \cdot t_{i,j} \cdot v_{i,j}\right) - \left(\sum_{\substack{i=1\ldots I \\ j=1\ldots J(i)}} x_i \cdot v_{i,j}\right)\left(\sum_{\substack{i=1\ldots I \\ j=1\ldots J(i)}} t_{i,j} \cdot v_{i,j}\right)}{\displaystyle\sum_{\substack{i=1\ldots I \\ j=1\ldots J(i)}} v_{i,j} \cdot \left(\sum_{\substack{i=1\ldots I \\ j=1\ldots J(i)}} t_{i,j}^2 \cdot v_{i,j}\right) - \left(\sum_{\substack{i=1\ldots I \\ j=1\ldots J(i)}} t_{i,j} \cdot v_{i,j}\right)^2} \quad (5)$$

and $$a = \frac{1}{\displaystyle\sum_{\substack{i=1\ldots I \\ j=1\ldots J(i)}} v_{i,j}} \cdot \left(\sum_{\substack{i=1\ldots I \\ j=1\ldots J(i)}} x_i \cdot v_{i,j}\right) - b \cdot \frac{1}{\displaystyle\sum_{\substack{i=1\ldots I \\ j=1\ldots J(i)}} v_{i,j}} \cdot \left(\sum_{\substack{i=1\ldots I \\ j=1\ldots J(i)}} t_{i,j} \cdot v_{i,j}\right) \quad (6)$$

or equivalently $$a = \frac{\left(\displaystyle\sum_{\substack{i=1\ldots I \\ j=1\ldots J(i)}} x_i \cdot v_{i,j}\right)\left(\sum_{\substack{i=1\ldots I \\ j=1\ldots J(i)}} t_{i,j}^2 \cdot v_{i,j}\right) - \left(\sum_{\substack{i=1\ldots I \\ j=1\ldots J(i)}} t_{i,j} \cdot v_{i,j}\right)\left(\sum_{\substack{i=1\ldots I \\ j=1\ldots J(i)}} x_i \cdot t_{i,j} \cdot v_{i,j}\right)}{\displaystyle\sum_{\substack{i=1\ldots I \\ j=1\ldots J(i)}} v_{i,j} \cdot \left(\sum_{\substack{i=1\ldots I \\ j=1\ldots J(i)}} t_{i,j}^2 \cdot v_{i,j}\right) - \left(\sum_{\substack{i=1\ldots I \\ j=1\ldots J(i)}} t_{i,j} \cdot v_{i,j}\right)^2} \quad (6')$$

with x(t) lateral position x versus time t of the regression curve 27, a, b parameters of the regression curve 27, $x_i$ predetermined lateral position of the $i^{th}$ antenna $12_i$, $t_{i,j}$ time of receipt of the $j^{th}$ signal $24_{i,j}$ received via the $i^{th}$ antenna $12_i$, $v_{i,j}$ signal strength of receipt of the $j^{th}$ signal $24_{i,j}$ received via the $i^{th}$ antenna $12_i$, I number of all antennas $12_i$, and J(i) number of all signals $24_{i,j}$ received via the $i^{th}$ antenna $12_i$.

It shall be mentioned that in the above-mentioned embodiments with a less regular antenna setup, e.g., with antennas $12_i$ having a different antenna gain and/or directivity, the gain and/or directivity can be taken into account as well when generating the regression curve 27 in step 21 to compensate for any irregularity, e.g., caused by different antenna efficiencies, unequal lateral positions of the antennas, etc.

In all of the abovementioned embodiments, subsequent data sanity, integrity and/or error checks may be conducted. For instance, a confidence level L may be computed by the processor 13 based on the generated regression curve 27 and the recorded signals $24_{i,j}$. The confidence level L can be any measure indicating the accuracy of fitting the recorded signals $24_{i,j}$ by the regression curve 27, e.g., a correlation coefficient, a coefficient of determination such as an $R^2$ or adjusted $R^2$ value, etc. Hence, in case of an unsatisfying confidence level, another regression curve 27, e.g., according to a different fitting function, may be subsequently employed to obtain a higher confidence level therewith.

In an exemplary variant, the confidence level L is a correlation coefficient and computed by the processor 13 from all the recorded lateral positions $x_i$ and the regression curve 27 evaluated at each recorded time of receipt $t_{i,j}$, for example according to $$L = \frac{N \cdot \left(\sum_{\substack{i=1\ldots I \\ j=1\ldots J(i)}} x_i \cdot x(t_{i,j})\right) - \left(\sum_{\substack{i=1\ldots I \\ j=1\ldots J(i)}} x(t_{i,j})\right) \cdot \left(\sum_{i=1,\ldots I} x_i \cdot J(i)\right)}{\sqrt{N \cdot \sum_{i=1,\ldots I} x_i^2 \cdot J(i) - \left(\sum_{i=1,\ldots I} x_i \cdot J(i)\right)^2} \cdot \sqrt{N \cdot \sum_{\substack{i=1\ldots I \\ j=1\ldots J(i)}} x(t_{i,j})^2 - \left(\sum_{\substack{i=1\ldots I \\ j=1\ldots J(i)}} (x(t_{i,j}))\right)^2}} \quad (7)$$

with

L confidence level, $x(t_{i,j})$ ... lateral position x of the regression curve 27 evaluated at the time of receipt of the $j^{th}$ signal 24$_{i,j}$ received via the $i^{th}$ antenna 12$_i$, $x_i$ predetermined lateral position of the $i^{th}$ antenna 12$_i$, I number of all antennas 12$_i$, and J(i) number of all signals 24$_{i,j}$ received via the $i^{th}$ antenna 12$_i$.

In another exemplary variant, the confidence level L is a coefficient of determination and computed by the processor 13 from all the recorded lateral positions $x_i$ and the regression curve 27 evaluated at each recorded time of receipt $t_{i,j}$, for example according to $$L = 1 - \frac{\sum_{\substack{i=1\ldots I \\ j=1\ldots J(i)}} (x_i - x_i(t_{i,j}))^2}{\sum_{i=1\ldots I} (x_i - \bar{x})^2 \cdot J(i)} \quad (8)$$

with

L confidence level, $x(t_{i,j})$ ... lateral position x of the regression curve 27 evaluated at the time of receipt of the $j^{th}$ signal 24$_{i,j}$ received via the $i^{th}$ antenna 12$_i$, $x_i$ predetermined lateral position of the $i^{th}$ antenna 12$_i$, $\bar{x}$ an average of the lateral antenna positions $x_i$ over all the recorded signals 24$_{i,j}$, I number of all antennas 12$_i$, and J(i) number of all signals 24$_{i,j}$ received via the $i^{th}$ antenna 12$_i$.

The presently disclosed subject matter is not restricted to the specific embodiments described in detail herein but encompasses all variants, combinations and modifications thereof that fall within the scope of the appended claims.

What is claimed is:

1. A method for determining a lateral position of a vehicle passing a road and carrying a transponder, the lateral position being transverse to a longitudinal direction of travel of the vehicle, the method using at least two antennas mounted at different predetermined lateral positions of the road and connected to a processor, the method comprising:

during the passing of the vehicle, wirelessly triggering the transponder and recording a multitude of signals from responses of the transponder by the processor, each signal being received via one of the at least two antennas and recorded as i) a time of receipt of said signal at said one of the at least two antennas and ii) the predetermined lateral position of said one of the at least two antennas;

generating by the processor a regression curve of lateral position versus time fitting all recorded signals; and determining by the processor the lateral position of the vehicle from the generated regression curve.

2. The method according to claim 1, wherein the at least two antennas are mounted at a same longitudinal position of the road.

3. The method according to claim 1, wherein the predetermined lateral positions of the at least two antennas are equidistant.

4. The method according to claim 1, wherein the at least two antennas have the same antenna gain and directivity.

5. The method according to claim 1, wherein the road comprises at least two lanes and wherein the lateral positions of the at least two antennas are predetermined with respect to the lanes and the lateral position of the vehicle is determined with respect to the lanes.

6. The method according to claim 1, wherein said triggering is performed repetitively.

7. The method according to claim 1, wherein said regression curve is a linear function according to $$x(t) = b \cdot t + a$$

wherein $$b = \frac{N \cdot \sum_{\substack{i=1\ldots I \\ j=1\ldots J(i)}} x_i \cdot t_{i,j} - \left(\sum_{i=1\ldots I} x_i \cdot J(i)\right) \cdot \left(\sum_{\substack{i=1\ldots I \\ j=1\ldots J(i)}} t_{i,j}\right)}{N \cdot \sum_{\substack{i=1\ldots I \\ j=1\ldots J(i)}} t_{i,j}^2 - \left(\sum_{\substack{i=1\ldots I \\ j=1\ldots J(i)}} t_{i,j}\right)^2}$$

and $a = \frac{1}{N} \cdot \left(\sum_{i=1\ldots I} x_i \cdot J(i)\right) - b \cdot \frac{1}{N} \cdot \left(\sum_{\substack{i=1\ldots I \\ j=1\ldots J(i)}} t_{i,j}\right)$ with x (t) lateral position x versus time t of the regression curve, a, b parameters of the regression curve, N number of all recorded signals, $x_i$ predetermined lateral position of the $i^{th}$ antenna, $t_{i,j}$ time of receipt of the $j^{th}$ signal received via the $i^{th}$ antenna, I number of all antennas, and J(i) number of all signals received via the $i^{th}$ antenna.

8. The method according to claim 1, wherein for each signal also iii) the signal strength of receipt is recorded and wherein, when generating said regression curve, each signal is weighted by its signal strength of receipt.

9. The method according to claim 8, wherein the regression curve is a linear function according to $$x(t) = b \cdot t + a$$

wherein $$b = \frac{\sum_{\substack{i=1...I \\ j=1...J(i)}} v_{i,j} \cdot \left( \sum_{\substack{i=1...I \\ j=1...J(i)}} x_i \cdot t_{i,j} \cdot v_{i,j} \right) - \left( \sum_{\substack{i=1...I \\ j=1...J(i)}} x_i \cdot v_{i,j} \right) \cdot \left( \sum_{\substack{i=1...I \\ j=1...J(i)}} t_{i,j} \cdot v_{i,j} \right)}{\sum_{\substack{i=1...I \\ j=1...J(i)}} v_{i,j} \cdot \left( \sum_{\substack{i=1...I \\ j=1...J(i)}} t_{i,j}^2 \cdot v_{i,j} \right) - \left( \sum_{\substack{i=1...I \\ j=1...J(i)}} t_{i,j} \cdot v_{i,j} \right)^2}$$

and $$a = \frac{1}{\sum_{\substack{i=1...I \\ j=1...J(i)}} v_{i,j}} \cdot \left( \sum_{\substack{i=1...I \\ j=1...J(i)}} x_i \cdot v_{i,j} \right) - b \cdot \frac{1}{\sum_{\substack{i=1...I \\ j=1...J(i)}} v_{i,j}} \cdot \left( \sum_{\substack{i=1...I \\ j=1...J(i)}} t_{i,j} \cdot v_{i,j} \right)$$

with x(t) lateral position x versus time t of the regression curve,
a, b parameters of the regression curve,
$x_i$ predetermined lateral position of the $i^{th}$ antenna,
$t_{i,j}$ time of receipt of the $j^{th}$ signal received via the $i^{th}$ antenna,
$v_{i,j}$ signal strength of receipt of the $j^{th}$ signal received via the $i^{th}$ antenna,
I number of all antennas, and
J (i) number of all signals received via the $i^{th}$ antenna.

10. An apparatus for determining a lateral position of a vehicle passing a road and carrying a transponder, the lateral position being transverse to a longitudinal direction of travel of the vehicle, the apparatus comprising:

at least one transmitter for wirelessly triggering the transponder; and
at least two antennas mounted at different predetermined lateral positions of the road;
the apparatus being characterised by a processor connected to the at least two antennas and configured to:
during the passing of the vehicle, record a multitude of signals from responses of the transponder, each signal being received by one of the at least two antennas and recorded as i) a time of receipt of said signal at said one of the at least two antennas and ii) the predetermined lateral position of said one of the at least two antennas;
generate a regression curve of lateral position versus time fitting all recorded signals; and
determine the lateral position of the vehicle from the generated regression curve.

11. The apparatus according to claim 10, wherein the at least two antennas are mounted at a same longitudinal position of the road.

12. The apparatus according to claim 10, wherein the predetermined lateral positions of the at least two antennas are equidistant.

13. The apparatus according to claim 10, wherein the at least two antennas have the same antenna gain and directivity.

14. The apparatus according to claim 10, wherein the road comprises at least two lanes and wherein the lateral positions of the at least two antennas are predetermined with respect to the lanes and the lateral position of the vehicle is determined with respect to the lanes.

15. The apparatus according to claim 10, wherein said transmitter is formed by at least one of said at least two antennas.

16. The apparatus according to claim 10, wherein said transmitter is formed by a transmit antenna separate from said at least two antennas.

* * * * *